Nov. 4, 1941.   O. L. PARSONS   2,261,407
HEATING SYSTEM
Filed Oct. 1, 1938
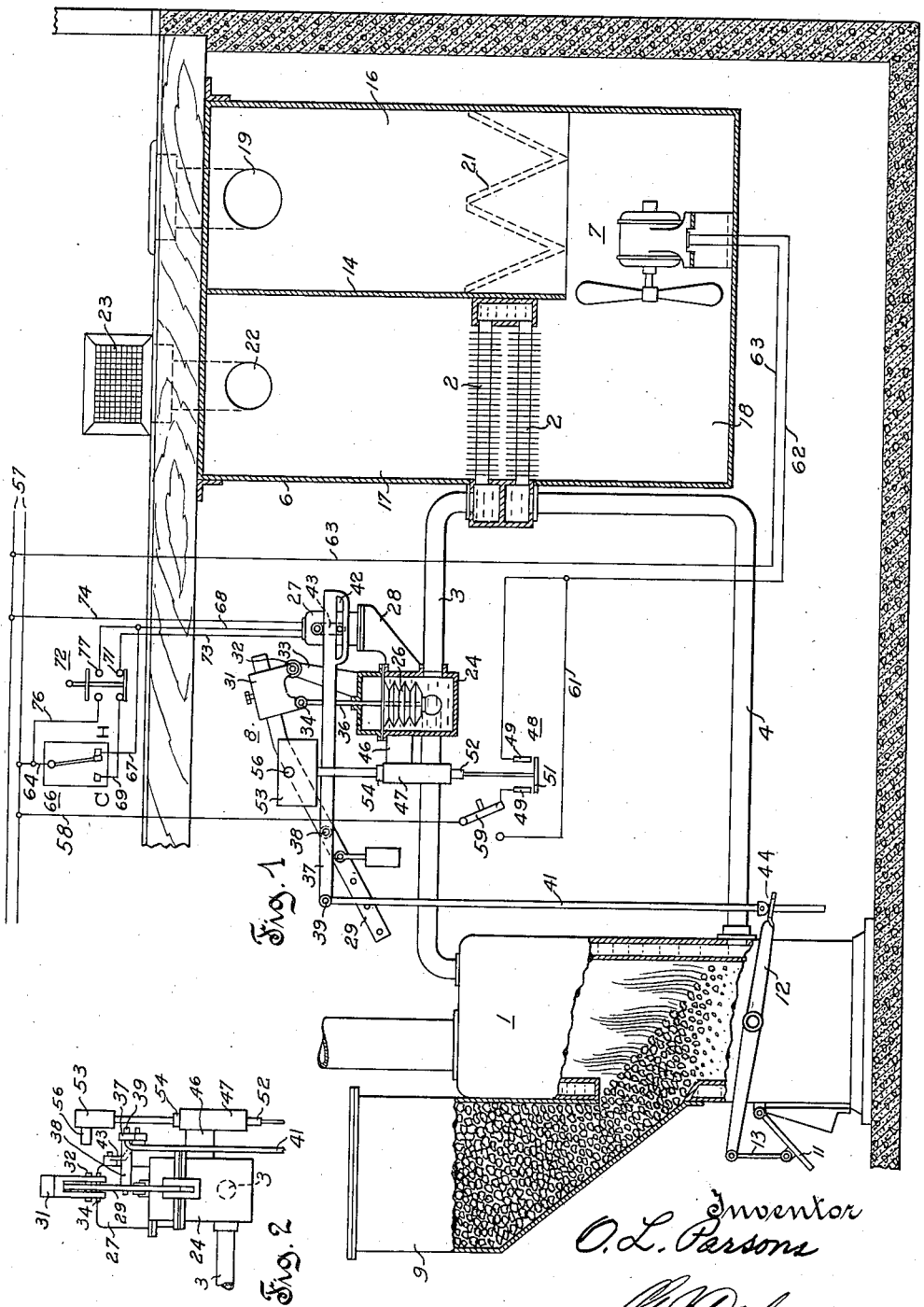

Patented Nov. 4, 1941

2,261,407

UNITED STATES PATENT OFFICE 2,261,407

HEATING SYSTEM

Oliver L. Parsons, Wauwatosa, Wis., assignor to Allis-Chalmers Manufacturing Company, Milwaukee, Wis., a corporation of Delaware Application October 1, 1938, Serial No. 232,710

7 Claims. (Cl. 236—9)

This invention relates to the control and operation of a heating system and more particularly to the control means and the manner of operating a heating system in which a heat conducting medium is heated and delivered to the space or spaces to be heated and in which the rate of combustion and the delivery or the acceleration of the delivery are controlled in accordance with the heat demand.

In known systems the usual practice is to so correlate a space thermostat, a furnace or primary fluid thermostat, a draft and/or fuel feeding mechanism and a means controlling the circulation of the heat conducting medium that when the temperature of the space to be heated reaches a predetermined minimum value the space thermostat, providing the temperature of the furnace or of the primary fluid is above a predetermined value, renders the means controlling or accelerating the delivery of the heat conducting medium operative to deliver or accelerate the delivery of the heat conducting medium which delivery or acceleration is maintained until the space temperature reaches a predetermined maximum value. The furnace or primary fluid thermostat generally controls the operation of the draft and/or fuel feeding mechanism although there are some installations, particular reference being had to the patent to Montrose K. Drewry U. S. 2,129,202, September 6, 1938, Air conditioning system, in which the space thermostat modulates the control of the draft and/or the fuel feeding mechanism effected by the furnace or primary fluid thermostat.

The known manner of operating systems of this type frequently causes the temperature of the space to be heated to reach the predetermined maximum value before or at the time the temperature of the furnace or primary fluid reaches its predetermined maximum value and, as a result, the operation of the means controlling or accelerating the delivery of the heat conducting medium is terminated before or at the time the draft producing and/or fuel feeding mechanism is operated to obtain the minimum draft and/or rate of fuel feed. Therefore, due to the fact that there is a considerable time lag, particularly in installations burning solid or liquid fuels, between the operation of the draft and/or the fuel feeding mechanism to decrease the rate of combustion or heat generation and the generation of heat at the minimum rate conforming with the decrease in draft and/or the rate of fuel feed, the heating plant continues to generate heat at a rate considerably in excess of the demand for heat which produces overheating and a consequent warping and misalignment of various parts of the heating plant which in turn causes rapid deterioration of the heating plant and a marked decrease in efficiency. Moreover, the dissipation of the excess heat in the room in which the heating plant is located causes a further decrease in the efficiency of the system.

In addition, delivering or accelerating the delivery of the heat conducting medium materially increases the rate of heat transfer which effects a rapid lowering of the temperature of the primary fluid and unless the temperature of the primary fluid is well above the predetermined minimum value or the heat storage capacity of the system is great the temperature of the primary fluid quickly falls below the predetermined minimum value and the delivery or the accelerated delivery of the heat conducting medium is discontinued until the temperature again reaches the predetermined minimum value. This condition is aggravated by combustion lag and necessitates maintaining a high rate of combustion for long periods of time which produces inefficient operation and extreme variations in the temperature of the heat generator and of the space to be heated.

Therefore an object of this invention is to provide a new mode of operating a heating system in which the rate of heat generation and the delivery or the acceleration of the delivery of the heat conducting medium are controlled in a manner to improve the efficiency of the system.

Another object of this invention is to provide a new mode of operation in which the rate of heat generation and the delivery or the acceleration of the delivery of the heat conducting medium are controlled in a manner to maintain the temperature of the heat generator and of the space to be heated more nearly uniform.

Another object of this invention is to provide a new mode of operating a heating system in which the rate of heat generation and the delivery or the acceleration of the delivery of the heat conducting medium are controlled in a manner to eliminate the undesirable effects of combustion lag.

Another object of this invention is to provide a novel mechanism which is readily applicable to existing systems and which is operable to control the rate of heat generation and the delivery or the acceleration of the delivery of the heat conducting medium in an improved manner.

Another object of this invention is to provide a novel mechanism for correlating a space thermostat, a primary fluid or furnace thermostat and a means for controlling or accelerating the delivery of the heat conducting medium to effect an improved mode of operation.

Still another object is to provide a novel mechanism for correlating a space thermostat, a primary fluid or furnace thermostat, a draft and/or fuel feeding means and a means for controlling or accelerating the delivery of the heat conducting medium to effect an improved mode of operation.

A further object of this invention is to provide a simplified and novel control mechanism for a heating system which is inexpensive to construct, install and operate.

Accordingly the invention consists of the mode of operation and of the various features of construction, combinations of elements and arrangements of parts as more fully pointed out in the appended claims and in the detailed description in which:

Fig. 1 is a schematic illustration of an indirect hot air system embodying the invention; and Fig. 2 is a partial end elevation of the control mechanism illustrated in Fig. 1 as seen when looking from left to right.

The heating system, reference being had to Fig. 1, comprises a hot water heater or boiler 1, a heat exchanger or radiator 2, which is connected in circulatory relation with the water jacketed casing of boiler 1 by means of pipes 3 and 4, a casing or cabinet 6 enclosing the radiator 2 and arranged to receive cold air from the space to be heated and to deliver heated air thereto, a motor driven fan unit 7 for accelerating the delivery of the heated air and a control mechanism designated generally by the numeral 8 responsive to the temperature of the space to be heated and to the temperature of the water delivered to the radiators and operative to control the rate of heat generation and the operation of the accelerating fan in accordance with the heat demand.

The boiler 1, which is of the solid fuel type, includes the usual grate structure (not shown), a closed fuel hopper 9 arranged for the gravity feed of fuel to the grate at a rate commensurate with the rate of fuel consumption and a draft door 11 operated by means of a pivoted lever 12 and link 13 for regulating the rate of combustion and heat generation. The pipes 3 and 4 are connected to the upper and lower portions, respectively, of the boiler water jacket to produce thermosyphon circulation of the water through the radiator 2.

The cabinet or casing 6 includes a depending partition member 14 which terminates in the lower portion of the casing and divides the interior of the casing into an air receiving and filtering chamber 16, an air heating chamber 17 and a fan chamber 18. One or more pipes 19 connect the upper portion of chamber 16 with the space or spaces to be heated. A filter element 21 of any desired construction extends entirely across the bottom portion of chamber 16 whereby air entering the chamber through the pipe 19 must pass through the filter 21 before entering the fan chamber 18. A pipe 22 connects the upper portion of the chamber 17 with the space to be heated by means of the register 23 and the radiator 2 extends entirely across the lower portion of this chamber whereby air entering the chamber 17 from the fan chamber 18 passes in heat exchanging relation to the radiator 2. The fan unit 7 when operating withdraws relatively cold air from the space to be heated through pipe 19, chamber 16, filter 21 and into the fan chamber 18 from which the air is forced through the radiator 2, chamber 17, pipe 22, register 23 and into the space to be heated. When the fan is not operating the previously described circulation of the air is maintained at a reduced rate due to thermosyphon action and although this mode of operation is generally preferred, it may be desirable to employ a fan or damper structure operable to prevent thermosyphon circulation when the fan is not operating.

The control mechanism, reference being also had to Fig. 2, includes a temperature responsive device 24 which contains a Sylphon bellows 26 and which is connected with the pipe 3 to render the bellows responsive to the temperature of the water flowing therethrough to the radiator 2 and a conventional 180° electric motor 27 which is supported on a fixed bracket 28 carried by the device 24. A counterweighted lever 29 is adjustably mounted in a connector 31 which has a pivotal connection 32 adjacent one end with a fixed bracket 33, which is also carried by the device 24, and a pivotal connection 34 adjacent its other end with the stem 36 of the bellows 26. A lever 37 is pivotally connected intermediate its ends at 38 with the lever 29 and has adjacent one end a pivotal connection 39 with one end of a damper rod 41 and adjacent its other end a sliding and pivotal connection 42 with the crank arm 43 of the motor 27. The lower end of damper rod 41 is pivotally connected at 44 with the draft operating lever 12. An inspection of the described lever arrangement reveals that a partial rotation of the motor crank arm 43 will cause the lever 37 to turn about its point of pivotal connection with the lever 29 and effect either an opening or a closing movement of the draft damper 11. The bellows 26 expands and contracts in response to variations in the temperature of the water in pipe 3 and by means of stem 36 actuates the lever 29 to turn about its point of pivotal connection 32 with the bracket 33 and since lever 29 is pivotally connected to the lever 37, movement of the lever 29 also effects either an opening or a closing movement of the draft damper 11. Thus it is seen that the levers 29 and 37 are operable jointly and severally to control the draft which in turn controls the rate of fuel consumption and the rate of heat generation. The water temperature responsive device 24 and the thermostatically controlled motor 27 are in fact separate actuating devices responsive to different conditions which vary in accordance with system operation.

A bracket 46 extends laterally from the device 24 and carries an elongated guide member 47. A switch 48 comprising a pair of stationary contacts 49 and a bridging contact 51 is actuated by means of an elongated stem 52 which is secured to the bridging contact 51 and extends upward through the guide member 47 to a point above the lever 37. Secured to the upper end of the stem 52 is a weight 53 which urges the stem 52 downward and tends to maintain the switch 48 in an open position. A stop 54 which is secured to the stem 52 and coacts with the top of the guide member 47 limits the downward movement of the stem 52 and bridging contact 51. The weight 53 carries a laterally projecting pin 56 which overlies the lever 37 whereby a predetermined upward movement of lever 37 will raise the weight 53, steam 52 and engage the bridging contact 51 with the stationary contacts 49 thereby closing switch 48. The damper rod 41 and the stem 52 for actuating switch 48 may be defined as movable members which are connected or adapted to be connected with means for controlling apparatus for regulating different system conditions, for example, the rate of heat generation and the delivery or the acceleration of the delivery of a heat conducting medium.

The circuit for energizing the fan motor 7 is connected across a source of power, line 57, and comprises wire 58 connected to one side of line 57, a two-way manual switch 59, switch 48 or wire 61 depending on the position of switch 59, wire 62, fan motor 7 and wire 63 back to the other side of line 57. When the manual switch 59 is in the position shown in Fig. 1, operation of the fan motor 7 is controlled by the switch 48 which is actuated by lever 37 and when the switch 59 is connected with wire 61 the switch 48 is rendered inoperative to control operation of fan unit 7 and the fan operates continuously. The latter arrangement is utilized to effect a cooling action by passing a cold fluid through radiator 2 to thereby cool rather than heat the air which is circulated thereover.

The circuit for energizing the 180° electric motor 27, comprises a wire 64 connected to one side of line 57, a thermostatic switch 66 having hot and cold contacts H and C, respectively, wires 67 and 68 connected in series with the hot contact H or wire 69, contacts 71 of manual switch 72 and wire 73 which are in series with the cold contact C, motor 27 and wire 74 back to the other side of line 57. A wire 76, which is connected with wire 64, contacts 77 of manual switch 72 and wire 68 provide a circuit for energizing motor 27 which is in parallel with that formed by the hot contact H of switch 66 and wire 67. When the temperature of the space to be heated reaches the desired maximum value, the thermostatic switch 66 closes the circuit including its hot contact H, wires 67 and 68, motor 27 and wire 74, thereby energizing the motor 27 and causing a rotation of its crank arm 43 through an angle of 180° to the position shown in Fig. 1. Partial rotation of the crank arm 43 to this position produces a clockwise turning movement of lever 37 about its point of pivotal connection with lever 29 which movement is away from the projecting pin 56 on weight 53. When the temperature of the space to be heated reaches the desired minimum value, the thermostatic switch closes the circuit including its cold contact C, wire 69, contacts 71 of switch 72, wire 73, motor 27 and wire 74, thereby energizing motor 27 and effecting a rotation of its crank arm 43 to a position 180° from that illustrated in Fig. 1. Partial rotation of crank arm 43 to this position effects a turning movement of the lever 37 above its point of pivotal connection with lever 29 in a counterclockwise direction and toward the projecting pin 56 on weight 53.

The point of pivotal connection between the levers 29 and 37 and between each lever and its respective operator or actuating device is preferably so chosen that when the lever 29 is in a position corresponding to a water temperature of less than 160° F., energization of motor 27 and a counterclockwise turning movement of lever 37 will not operate to close the switch 48, that when the lever 29 is in a position corresponding to a water temperature between 160 to 180° F., energization of motor 27 and a counterclockwise movement of lever 37 will cause the lever 37 to engage the projecting pin 56 on weight 53 and close the switch 48, or if the rotation of the lever 37 is in the opposite direction, the switch 48 will be opened, and that when the lever 29 is in a position corresponding to a water temperature above 180° F. the resulting position of lever 37 is such that the switch 48 is maintained closed regardless of the position of the crank arm 43 of motor 27. However, the point of connection between the levers 29 and 37 may be so selected that when the temperature of the water is above 160°, operation of the accelerating fan 7 is controlled solely by a turning movement of the lever 37 produced by a partial rotation of crank arm 43 of motor 27. The specified temperature limits are merely illustrative and thus it is seen that when the water temperature is less than a predetermined minimum, the fan motor will not operate, that when the water temperature is within predetermined limits, operation of the fan motor is controlled by the space temperature thermostat and that when the water temperature exceeds a predetermined maximum, the fan motor operates regardless of the heat demand and the position of the crank arm 43.

During normal operation of the system to supply the demand for heat, the manual switch 72 is in the position shown in Fig. 1. However, if the boiler is operated to heat water for domestic purposes, the flow of hot water through the radiator 2 is discontinued during warm weather and under these conditions the manual switch 72 is operated to close contacts 77 and open contacts 71, thereby energizing the circuit comprising wires 64 and 76, contacts 77 of switch 72, wire 68, motor 27 and wire 74, whereby the motor crank arm 43 and the lever 37 will be moved to or retained in the position shown in Fig. 1. With this arrangement the draft and the rate of fuel consumption is regulated solely by movements of lever 29 in response to variations in the water temperature.

The connection between the damper operating lever 12, rod 41 and the levers 29 and 37 is such that regardless of the position of crank arm 43 of motor 27, movement of the lever 29 from the cold position to the position attained when the water temperature reaches a predetermined minimum, does not move the damper 11 sufficiently to effect a material reduction in the draft and that as the lever 29 moves from the minimum temperature position to the position attained when the water reaches the predetermined maximum temperature, the damper is progressively moved towards its fully closed position to decrease the draft and the rate of fuel consumption in accordance with increases in temperature to obtain a minimum rate of combustion when the water temperature reaches the predetermined maximum. In addition, the relation between levers 29 and 37 is such that when the lever 37 is in the position effected by a movement of crank arm 43 of motor 27 through an angle of 180° from the position shown in Fig. 1, and when the lever 29 is in its maximum temperature position, the damper 11 is fully closed. Consequently, since levers 29 and 37 are operable jointly and severally to regulate the draft, it is obvious that except when the lever 29 is in its maximum temperature position, operation of motor 27 to effect a counterclockwise turning movement of lever 37 and energization of the accelerating fan 7 always increases the draft and the rate of fuel consumption to increase the rate of heat generation.

The herein described control mechanism when applied to a heating system in the manner described produces efficient operation and maintains uniform temperature conditions by operating as follows: Regulating the draft and/or the rate of fuel feed to maintain a high rate of combustion when the temperature of the heat generator (the temperature of the heating jacket of a hot air furnace or the temperature of the water, steam or vapor in a closed system) is less than a predetermined minimum and to decrease the draft and/or the rate of fuel feed in accordance with increases in temperature above the predetermined minimum to obtain a minimum rate of combustion when the temperature of the generator reaches a predetermined maximum, operating the heat conducting medium control means (accelerating fan 7 in the illustrated arrangement or any suitable impeller or valve operable to control the flow of the heat conducting medium employed and to prevent thermosyphon circulation of the heat conducting medium if such control is desired) to deliver or accelerate the delivery of the heat conducting medium, whenever the temperature of the space to be heated is less than a predetermined value and the temperature of the generator exceeds the predetermined minimum, regulating the draft and/or the rate of fuel feed to increase the draft and/or the rate of fuel feed whenever the heat conducting medium control means is operated to deliver or accelerate the delivery of the heat conducting medium and the temperature of the heat generator is less than the predetermined maximum, and operating the heat conducting medium control means to deliver or accelerate the delivery of the heat conducting medium whenever the temperature of the heat generator exceeds the predetermined maximum.

Operation of the accelerating fan materially increases the rate of heat transfer which effects a rapid lowering of the water temperature and unless the water temperature is well above the predetermined minimum or the heat storage capacity of the system is great, the temperature of the water quickly falls below the predetermined minimum value and further operation of the accelerating fan is prevented until the temperature again reaches the predetermined minimum value. This condition is aggravated by combustion lag and necessitates maintaining a high rate of combustion for relatively long periods of time which results in extreme temperature variations both in the heat generator and in the space to be heated. Increasing the draft and the rate of fuel consumption whenever the accelerating fan is operated eliminates the effects of combustion lag, materially reduces the rate of combustion and the time interval during which a higher rate of combustion is necessary and maintains the temperature of the generator and of the space to be heated more nearly uniform. Consequently this mode of operation improves combustion efficiency and eliminates the destructive effects produced by maintaining high rates of combustion for long periods of time. The efficiency of combustion and of heat exchange are further improved by operating the accelerating fan whenever the water temperature exceeds the predetermined maximum and regardless of the position of crank arm 43 of motor 27 as such operation prevents overheating and a consequent burning, warping and misalinement of the furnace parts and the wasteful dissipation of the excess heat in the space where the heat generator is located.

The invention is illustrated and described in connection with a simplified indirect hot air system in order to eliminate all details not essential for a complete understanding of the invention and for complete details, particularly with respect to the structural details necessary for operation of the system to furnish hot water for domestic purposes and to effect a cooling action when desired, attention is directed to the patent to Montrose K. Drewry previously identified. Obviously, regulation of the rate of heat generation may be effected by any desired form of mechanism operable to control the rate of fuel feed and/or the draft in the manner described and it should also be obvious that the control apparatus and the described mode of operation are readily applicable to the ordinary hot air system and to direct heating systems in which a heat conducting medium such as water, steam or vapor is conducted to radiators or heat exchangers located in the space or spaces to be heated. Therefore it should be understood that it is not desired to limit the invention to the exact details of construction and operation herein shown and described for various modifications within the scope of the claims may occur to persons skilled in the art.

It is claimed and desired to secure by Letters Patent:

1. In a heating system combination including a heat generator, means for controlling the rate of heat generation, means for delivering a heat conducting medium in heat exchanging relation with the heat generator and to the space to be heated, and means for controlling or accelerating the delivery of the heat conducting medium, means for controlling the rate of heat generation and the delivery or the acceleration of the delivery of the heat conducting medium comprising a first lever pivotally mounted adjacent one end and operatively connected with a device actuated in response to temperature variations in the heat generator, a second lever pivotally connected intermediate its ends with said first lever and having one end operatively connected with the means controlling the rate of heat generation and its other end operatively connected with a device actuated in response to temperature variations in the space to be heated whereby said temperature responsive devices are jointly and severally operable to actuate the means controlling the rate of heat generation, and means operatively associating the heat conducting medium control means and said second lever so that a predetermined movement of said second lever operates the heat conducting medium control means to deliver or accelerate the delivery of the heat conducting medium, and so that whenever the temperature of the heat generator exceeds a predetermined minimum each of said temperature responsive devices is independently operable in response to a predetermined change in the temperature to which the device is responsive to effect the said predetermined movement of said second lever.

2. Temperature regulating apparatus comprising means operable to effect a delivery or an accelerated delivery of a heated medium, separate devices each movable in response to a change in a different condition affected by the operation of the heated medium delivery means, mechanism including a movable member interconnecting and rendering said separate devices jointly and severally operable to actuate said member, an element controlling the operation of said heated medium delivery means and operatively associated with said member to effect a delivery or an accelerated delivery of the heated medium in response to a predetermined movement of said member, one of said devices being operable to effect said predetermined movement of said member only after another of said separate devices has moved a predetermined distance in one direction, and said another of said devices being operable to effect the said predetermined movement of said member only after the said another device has moved an additional predetermined distance in said one direction.

3. In a combination including a heat generator, means for delivering a heated medium to a space to be heated, and a heated medium flow varying means, means for increasing or accelerating the delivery of the heated medium comprising a first movable device responsive to a condition which varies in accordance with the temperature of the heat generator, a second movable device responsive to a condition which varies in accordance with the temperature of the space to be heated, an element controlling said flow varying means and operative when moved to a predetermined position to actuate said flow varying means to effect an increased or an accelerated delivery of the heated medium, mechanism interconnecting said element and said first and second devices, and said mechanism being operative whenever the temperature of said heat generator exceeds a predetermined value, to render each of said devices independently operable in response to a predetermined change in the condition to which it responds to effect a movement of said element to said predetermined position.

4. In a combination including a heat generator, a first means for varying the rate of heat generation, a second means for delivering a heat conducting medium to a space to be heated, and a third means for increasing or accelerating the delivery of the heat conducting medium, means controlling the rate of heat generation and the delivery or the acceleration of the delivery of the heat conducting medium comprising a first movable device responsive to a condition which varies in accordance with the temperature of the heat generator, a second movable device responsive to a condition which varies in accordance with the temperature of the space to be heated, an element controlling said third means and operative when moved to a predetermined position to actuate said third means to effect an increased or an accelerated delivery of the heat conducting medium, mechanism interconnecting said first means and said first and second devices and rendering said first and second devices jointly and severally operable to actuate said first means, and said mechanism being operative whenever the temperature of said heat generator exceeds a predetermined value, to render each of said devices independently operable in response to a predetermined change in the condition to which it responds to effect a movement of said element to said predetermined position.

5. In a combination including a heat generator, a first means for varying the rate of heat generation, a second means for delivering a heat conducting medium to a space to be heated, and a third means for increasing or accelerating the delivery of the heat conducting medium, means for controlling the rate of heat generation and the delivery or the acceleration of the delivery of the heat conducting medium comprising a first movable device responsive to a condition which varies in accordance with the temperature of the heat generator, a second movable device responsive to a condition which varies in accordance with the temperature of the space to be heated, mechanism including a movable member interconnecting and rendering said first and second devices jointly and severally operable to actuate said member and said first means, said mechanism being operative whenever the temperature of the heat generator exceeds a predetermined value to render each of said first and second devices independently operable in response to a predetermined change in the condition to which it responds to effect a predetermined movement of the said member, and an element controlling said third means and operatively associated with said member to effect an increased or an accelerated delivery of the heat conducting medium in response to said predetermined movement of the said member.

6. In a space heating system combination including a heat generator, a first means for varying the rate of heat generation, a second means for delivering a heated medium to a space to be heated, and a third means for varying the flow of the space heating medium, means for controlling the rate of heat generation and the flow of the space heating medium comprising a first device responsive to a condition which varies in accordance with the temperature of the heat generator, a second device responsive to a condition which varies in accordance with the temperature of the space to be heated, mechanism including a pair of relatively movable levers interconnecting said first means and said first and second devices and rendering said first and second devices jointly and severally operable to actuate said first means, said mechanism being operative whenever the temperature of the heat generator exceeds a predetermined value, to render each of said first and second devices independently operable in response to a predetermined change in the condition to which it responds to effect a predetermined movement of one of said levers, and an element controlling said third means and operatively associated with said one lever to effect a delivery or an accelerated delivery of the heat conducting medium in response to said predetermined movement of the said one lever.

7. In a combination including a heat generator, a first means for varying the rate of heat generation, a second means for delivering a heat conducting medium to a space to be heated, and a third means for controlling or accelerating the delivery of the heat conducting medium, means for controlling the rate of heat generation and the delivery or the acceleration of the delivery of the heat conducting medium comprising a first movable device responsive to a condition which varies in accordance with the temperature of the heat generator, a second movable device responsive to a condition which varies in accordance with the temperature of the space to be heated, mechanism including a movable member interconnecting and rendering said first and second devices jointly and severally operable to actuate said member and thereby said first means, an element controlling said third means and operatively associated with the said member to effect a delivery or an accelerated delivery of the heat conducting medium in response to a predetermined movement of said member, said second device being operable to effect said predetermined movement of said member only after said first device has moved a predetermined distance in one direction, and said first device being operable to effect the said predetermined movement of said member only after the said first device has moved an additional predetermined distance in said one direction.

OLIVER L. PARSONS.